(12) United States Patent
Simske et al.

(10) Patent No.: US 8,864,041 B2
(45) Date of Patent: *Oct. 21, 2014

(54) SYSTEM FOR GENERATING AN INCREMENTALLY COMPLETED 2D SECURITY MARK

(75) Inventors: Steven J Simske, Fort Collins, CO (US); Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/810,682

(22) PCT Filed: Oct. 12, 2010

(86) PCT No.: PCT/US2010/052407
§ 371 (c)(1),
(2), (4) Date: Jan. 17, 2013

(87) PCT Pub. No.: WO2012/050570
PCT Pub. Date: Apr. 19, 2012

(65) Prior Publication Data
US 2013/0193216 A1    Aug. 1, 2013

(51) Int. Cl.
*G06K 19/06*    (2006.01)
*G06Q 10/06*    (2012.01)

(52) U.S. Cl.
CPC ......... *G06K 19/06037* (2013.01); *G06Q 10/06* (2013.01)
USPC .................. 235/494; 235/462.08; 235/462.09

(58) Field of Classification Search
USPC ............... 235/462.01, 462.08, 462.09, 494
See application file for complete search history.

(56) References Cited

U.S. PATENT DOCUMENTS

| 7,191,336 | B2 | 3/2007 | Zeller et al. |
| 2004/0061327 | A1 | 4/2004 | Hilton et al. |
| 2004/0184772 | A1* | 9/2004 | Kakii ............................. 386/46 |
| 2007/0278303 | A1* | 12/2007 | Cattrone .................... 235/462.1 |
| 2009/0108081 | A1* | 4/2009 | Zwirner et al. ............... 235/494 |
| 2009/0141892 | A1 | 6/2009 | Simske et al. |
| 2009/0212111 | A1* | 8/2009 | Krichi et al. ............. 235/462.11 |
| 2009/0257618 | A1* | 10/2009 | Tapson et al. ................. 382/100 |

(Continued)

FOREIGN PATENT DOCUMENTS

WO    2009/139631    11/2009

OTHER PUBLICATIONS

Simske, S.J. et al. Document Imaging Security and Forensics Ecosystem Considerations. In: DocEng '10 Proceedings of the 10th ACM Symposium on Document Engineering, Manchester, UK, Sep. 2010, pp. 41-50, See the whole document.

*Primary Examiner* — Tuyen K Vo

(57) ABSTRACT

A system (10) for generating an incrementally completed 2D security mark (20''') includes a computer-readable medium encoded with a computer program. The computer program has computer readable code for selecting a symbology for the 2D security mark (20'''), computer readable code for selecting a scrambling technique for data to be placed into a carrier object (20, 20', 20'', 20''') of the 2D security mark (20''') at each stage in the workflow, and computer readable code for selecting a manner in which a state change of the carrier object (20, 20', 20'', 20''') at each stage in the workflow results in a predictable change in the 2D security mark (20'''). The system the system further includes memory and a processor operatively coupled to the memory and to the computer-readable medium.

16 Claims, 4 Drawing Sheets

(56) References Cited

U.S. PATENT DOCUMENTS

2009/0308922 A1 12/2009 Chaum
2010/0169649 A1 7/2010 Haas et al.
2011/0163169 A1* 7/2011 Saldana et al. ................ 235/494
2013/0271521 A1* 10/2013 Saldana et al. ................. 347/14

* cited by examiner

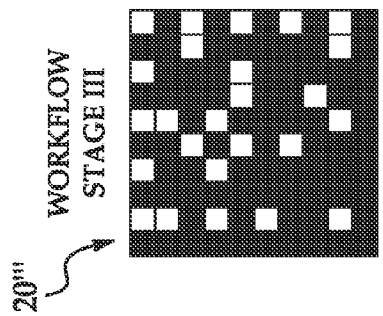
FIG. 4A
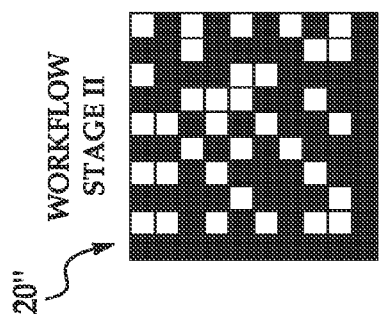
FIG. 4B
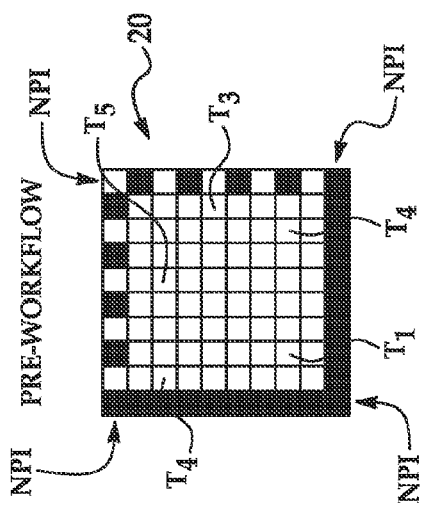
FIG. 4C
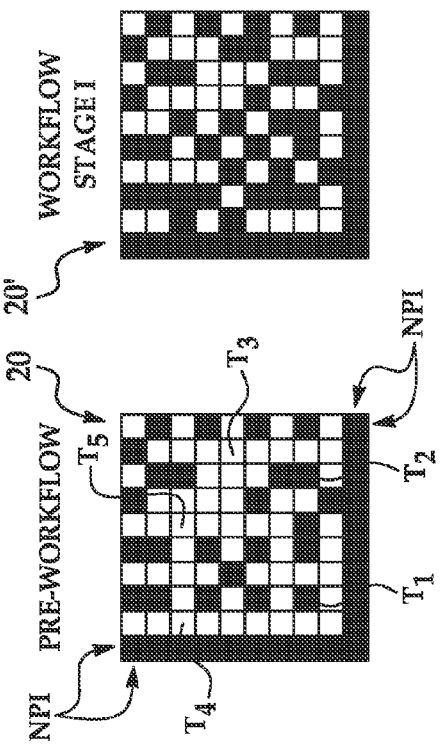
FIG. 4D
FIG. 4E

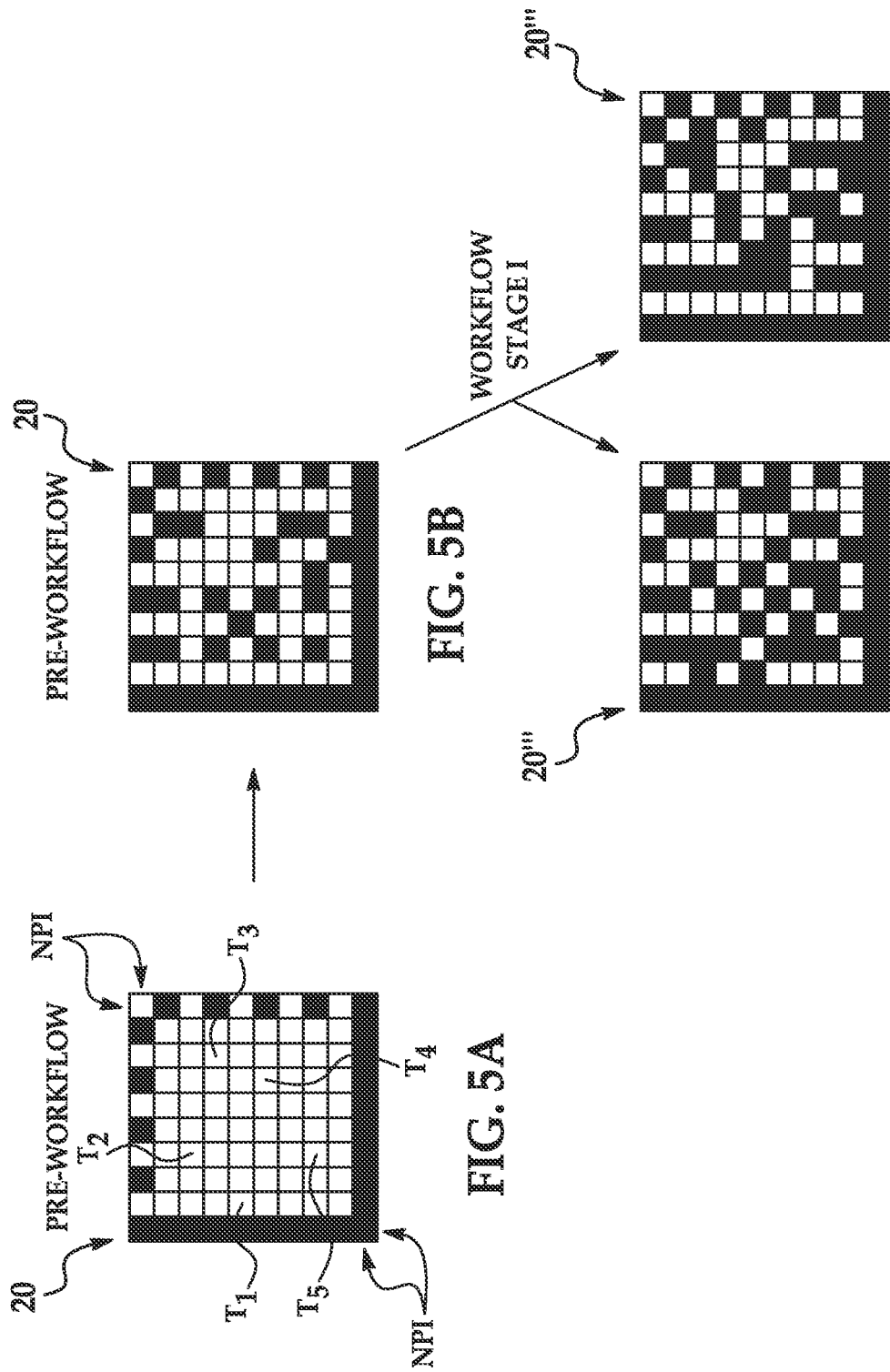

SYSTEM FOR GENERATING AN INCREMENTALLY COMPLETED 2D SECURITY MARK

BACKGROUND

The present disclosure relates generally to a system for generating an incrementally completed 2D security mark.

Documents exist in both physical (e.g., printed) and electronic forms. During its lifecycle (i.e., the document in all its forms from creation to completion), one document may move between physical (e.g., paper) and electronic (e.g., computer file) forms several times and may also progress through several stages of a workflow (i.e., a defined set of stages, usually with task(s) at each stage, which a document must pass through during its lifecycle, to perform some useful purpose). Security features laden with information (e.g., bar codes) may be associated with the document, and may be used to move the document from one stage to the next in its workflow. As one example, sequential security features (e.g., sequential barcodes) may be added to the document at each stage in the workflow. This approach may be useful because each stage of the workflow can be associated with one of the sequential barcodes, and thus the status of the workflow can be monitored via the barcodes that have been added. As another example, a single static security feature (e.g., one barcode) may be used throughout the workflow to identify the item. This approach is sensitive to the use of "real estate" (layout area) on the physical form of the document, but does not enable one to monitor the status of the workflow via the security feature.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4E depict an embodiment of a carrier object as it progresses through a workflow and has information incrementally written thereto to generate an embodiment of a 2D identifying object (i.e., 2D security mark); and FIGS. 5A through 5D depict another embodiment of a carrier object as it progresses through a workflow, where FIGS. 5C and 5D illustrate two examples of how the carrier object can have information incrementally written thereto during a single stage of a workflow.

DETAILED DESCRIPTION

Embodiments of the system disclosed herein are used to generate a 2D identifying object (e.g., a feature or mark laden with information). In an embodiment, the information-carrying identifying object does not grow in size and/or shape as the item moves through a workflow associated therewith, even though information may be added at each stage of the workflow. The 2D identifying object may be designed taking into account security needs, the type of readers available, and other concerns (e.g., branding, fraud prevention, robustness to damage, etc.).

As previously mentioned, a workflow is a defined set of stages, usually with task(s) at each stage, which a document must pass through during its lifecycle. In one embodiment, the workflow is an automated process during which documents, information, and/or tasks are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics [e.g., inventory, average time at a node, etc.], compliance, auditing, etc.). In other words, a workflow is any defined set of tasks to complete associated with a document. Also as used herein, a "node" refers to a then-current stage in the workflow. In one embodiment, if a document moves from a creator to an editor to a subscriber, the respective nodes are, for example, creation, editing, and receiving. At any instance, the node corresponds with a current version (whether physical or electronic) of a document (e.g., a composite document, or a document including several items (e.g., PDFs, PPTs, DOCs, etc.)). It is to be understood that nodes can also be in parallel, for example, when multiple recipients need to acknowledge receipt.

The document and its associated 2D identifying object may be physical (e.g., print over the same sheet at each stage in the workflow), electronic (e.g., information added electronically and displayed on an electronic display), and/or mixed physical and electronic (e.g., printed and scanned, information added electronically, and then re-printed). A mixed 2D identifying object includes a carrier object that can flow/transition between the physical and electronic forms throughout its lifecycle.

Figure 1:
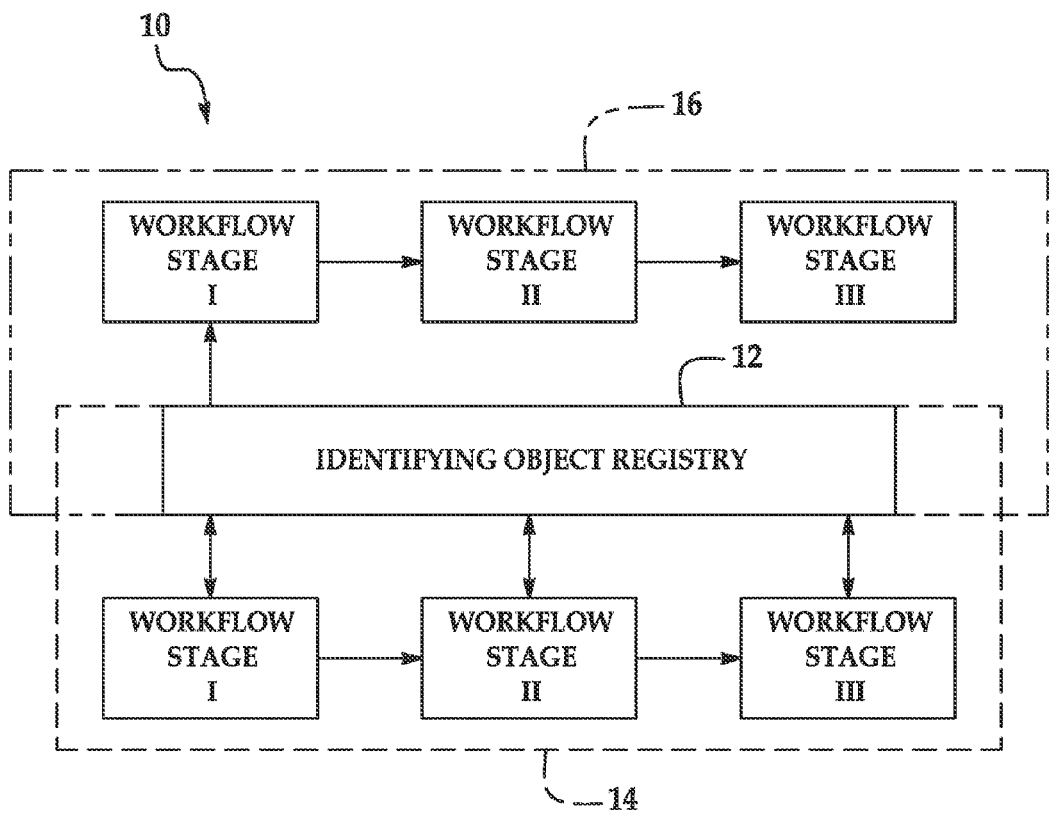
FIG. 1 is a schematic diagram of two embodiments of a system for generating an incrementally completed 2D security mark.

Referring now to FIG. 1, an embodiment of the system 10 for generating embodiments of the identifying object is depicted. As shown in FIG. 1, the system 10 may be set up to perform a registry-based workflow 14 or an independent incremental workflow 16. Each of these workflows 14, 16 involves a different path by which the document and identifying object are received at the various stages. When a registry-based workflow 14 is utilized, at each stage in the workflow, a user receives the document and its associated carrier object (discussed further hereinbelow) from the previous user, but the user can refer back to the registry 12 for information about the document and its associated carrier object. The addition to the carrier object at each stage in the workflow will be performed in conjunction with the registry 12. When an independent incremental workflow 16 is utilized, there is no backward visibility in the workflow stage-stage transmission, and the user receives the document and an intelligent hash of the previous state of the carrier object from the previous user. In this embodiment, the users at the various workflow stages may/do not have access to the registry 12 (i.e., the carrier object is updated independently of the registry 12), and the addition to the carrier object at each stage in the workflow will be performed in conjunction with initial instructions received from the registry 12. This embodiment may be desirable, for example, when the distribution network organization is proprietary.

In an embodiment, each stage of the workflow can be deduced when the starting point is known, as most workflows have a small and well-defined set of nodes. Workflow exceptions may occur, however, when extra steps have been added and the workflow has gone on too long (e.g., a non-legitimate progression) and/or when available space for writing becomes sparse during the workflow. In such instances, each stage of the workflow may not be deduced.

The system 10 includes the identifying object registry 12 that includes hardware (e.g., memory, processor, etc.) and/or software (computer program(s) with computer readable code) for generating an incrementally completed 2D barcode/security mark. Access to the registry 12 may be secure (e.g., requiring a login and password or other authorization method, such as biometric validation of identity, possession of a secure token, etc.) or unsecure (e.g., publicly accessible).

In one embodiment (e.g., when the registry-based workflow 14 is used), the system 10 may be set up as a cloud computing network, which may be a virtualized bank of computers (e.g., processors and/or servers) that enables Internet-based computing. Via the cloud network, shared resources, software and information are provided to various computing devices (i.e., those operating at the various workflow stages, whether stationary (e.g., desktop computers) or mobile (e.g., laptop computers, netbooks, cellular phones, personal digital assistants (PDAs), etc.)) on-demand. The cloud computing network allows the registry system provider (not shown) to deliver the identifying object registry 12 and its various services to subscribers (or non-subscribers if access is unsecure) online via another web service or software, such as a web browser. Software and data associated with the cloud computing network are stored on servers and their associated memory (not shown).

In another embodiment (e.g., when the independent incremental workflow 16 is used), the system 10 may be set up as a network for use with a proprietary system where a bank of computers (e.g., processors and/or servers) i) has no backward visibility in the workflow and ii) enables computing based upon that which is received from a previous node in the workflow. Each computer has its own software and data stored on servers and their associated memory (not shown).

Figure 2:
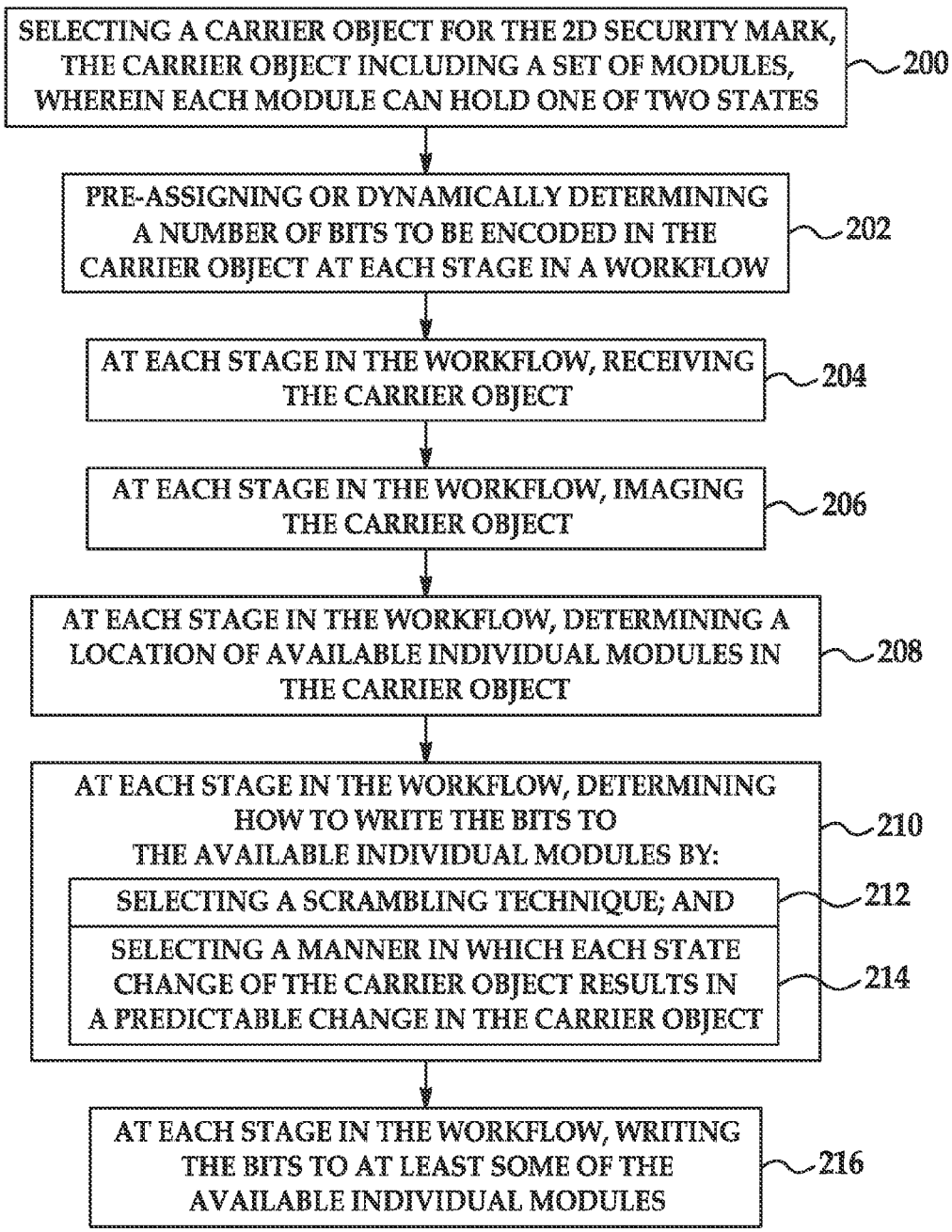
FIG. 2 is a flow diagram of an embodiment of a method for generating an embodiment of the incrementally completed 2D security mark.

One embodiment of the method for generating the identifying object using the system 10 is shown in FIG. 2. It is to be understood that the various steps of the method are further discussed hereinbelow.

Figure 3A:
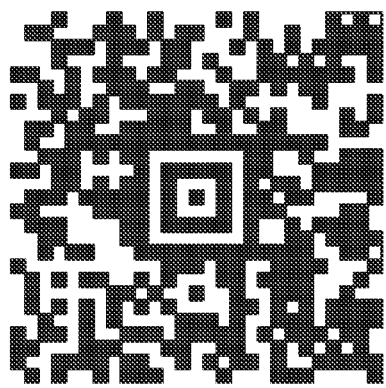
FIGS. 3A and 3B illustrate different embodiments of the 2D security mark.
Figure 3B:
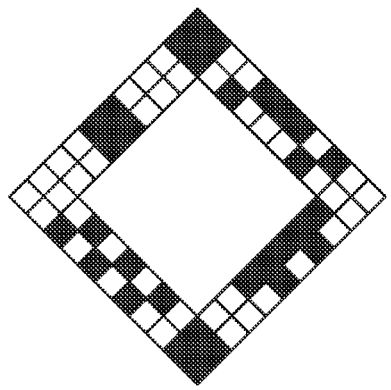

Prior to configuring the system 10 and its various components to generate an identifying object, the stages of the workflow can be set and a number of payload elements to write in total or during each state of the workflow can also be set. In some instances however, the number of payload elements may be dynamically determined at any stage in the workflow (e.g., if additional bits need to be added for security at a stage of the workflow that takes place outside of a secure environment). In one embodiment, a carrier object may be selected first (see, e.g., reference numeral 200 in FIG. 2), and then the workflow and number of payload elements may be designed around the selected carrier object. In another embodiment, the workflow and the number of payload elements may be selected, and then the carrier object may be selected to fit the specifications of both the workflow and the total number of bits to be encoded (i.e., the carrier object contains all needed modules for every step in the workflow during creation of the final identifying object). A carrier object is the feature or mark that will be incrementally written to throughout the workflow to form the identifying object (i.e., 2D barcode or security mark). The carrier object includes a field of modules/glyphs/areas (e.g., marks, dots, graphics, symbols, etc.) that has two possible stares, where each state is readily disambiguated from each other state. One of the two possible states is white and/or some other designated color (i.e., a background state which is an unwritten to state, i.e., contains 0 bits) and the other of the two possible states is black and/or some other designated color (i.e., a foreground state which is a written to state, i.e., contains 1 bit). As examples, the carrier object state may be indicated by the inclusion of modules having black or white states; by modules having black or white states and modules having another color (besides black, e.g., red) and white states; or by modules having two different color states other than black and white (e.g., blue and yellow). When modules with black and white states and modules with another color and white states are used in the same carrier object, it may be desirable to write to the modules to obtain the black state in one stage of the workflow and to write to the modules to obtain the other color state at another stage in the workflow. Non-limiting examples of suitable carrier objects for a 2D security mark includes a barcode made up of a set of modules. The modules may be tiles, lines, etc. Tiles may include square shaped tiles, rectangular shaped tiles, triangle shaped tiles, other shaped tiles (e.g., circular, oval, etc.), mixed shaped tiles, mixed sized tiles, non-uniformly shaped tiles, or combinations thereof. The carrier object (and the final 2D identifying object) may have a symbology that resembles pre-existing symbologies, such as the 2D DataMatrix or the Aztec (see FIG. 3A), or may have a symbology that is new or customized (see FIG. 3B). Each state of the carrier object is determined by the set of modules that have been written to at a given stage of the workflow.

It is to be understood that any desired foreground/background combination may be selected for the carrier objects and 2D security marks. In any symbology, there is 1 bit per module that may be encoded.

In one embodiment, the carrier object, the workflow, and the number of bits are set at the identifying object registry 12. The identifying object registry 12 includes a computer-readable medium with a computer program including computer readable code for selecting the carrier object, selecting a number of steps/stages in the workflow, selecting a statistically driven security level for each step/stage in the workflow, and pre-selecting (i.e., before the workflow is initiated) or dynamically determining (i.e., as the workflow is in progress) a number of payload elements (e.g., bits) to be input at each step/stage in the workflow (see reference numeral 202 of FIG. 2). The workflow and preset number of payload elements may be set or defined using information received at the registry 12 from one or more participants in the workflow. For example, a product manufacturer may request that a workflow be set up for a particular product, and may provide the following information: the distributor, the retailer, and product identification information (e.g., serial number). The identifying object registry 12 may then select a suitable carrier object, generate a suitable workflow, and preset payload information based upon this information. The carrier object and the preset number of payload elements may also be set by the workflow, and thus can be accessed (or looked up) using a number of methods.

In the example provided above, the workflow may involve three stages, the manufacturer, the distributor, and the retailer. At each stage, the workflow may require an individual (e.g., at the manufacturer or distributor) to sign a document associated with the product prior to shipping the product and document to the next entity, and may require an individual at the retailer to sign the document upon receiving the product and document.

The number of payload elements to write to the carrier object at each stage of the workflow is proportional to the desired minimum level of (statistically based) security at any given stage. High-level security stages may write more bits of information to the carrier object, while low-level security stages may write less bits of information to the carrier object. Hamming distance (i.e., the sum of bits, defined in the glyphs/areas of the carrier object, that are different from one stage to the next) and/or probability (i.e., what level of confidence is needed so that the next state of the carrier object cannot be guessed with p probability) may be used to identify the number of bits to encode at each stage of the given workflow.

In one embodiment, the Hamming distance between successive stages is fixed. As mentioned above, the Hamming distance is the sum of bits that are different from one state to the next, and is fixed for one or more embodiments of the identifying object disclosed herein.

In one embodiment, determining the probability involves determining the number of ways of writing to each stage in the workflow. For writing M bits to the carrier object at a particular stage with N glyphs still open for writing, there are N!/M!(N−M)! ways of writing to the next stage. Suppose there are a total of 32 bits to write to a carrier object and it is desirable to include 4 bits at one stage in the workflow. The carrier object selected should include at least 32 available glyphs for writing, and thus when encoding the 4 bits, the first bit could be written in 32 places, the second bit could be written in 31 places, the third bit could be written in 30 places, and the fourth bit could be written in 29 places. There are 24 different ways (orderings) to write these 4 bits, and as such, there are (32*31*30*29)/(4*3*2*1)=35,960 unique ways to write the four bits in a carrier object having 32 available glyphs for writing. In this example, the 35,960 unique ways to reach the next state represent more than $2^{15}$ different possibilities, and so effectively represent just over 15 bits of security. Additionally, this example represents a situation in which there is merely a one in a 35,960 chance of someone guessing the right way to write these glyphs. The probabilities for each stage may be predicted in a similar manner.

It is to be understood that even non-binary identifying objects can be unzipped to be a binary string. For example, a non-binary identifying object which includes modules that can be one of eight states can be unzipped initially to a bit string length that is three times that of a binary identifying object since $8=2^3$ and $2=2^1$.

When the total number of bits is known and the probability is known (set based upon a desired security level) or calculated (as illustrated above), this information may be used to determine the number of bits to write to each stage of the given workflow. As one example, suppose that there are a total of 100 bits to write to a carrier object throughout the workflow and the security requirement at each stage is such that there is less than a one in a $10^{12}$ probability of guessing the correct states of the carrier object, then $100!/M!(100-M)! \geq 10^{12}$, or $M \geq 9$. In this example, 9 or more bits may be written to at each workflow stage. For example, if the workflow has three steps, 33 bits may be written at the first two stages, and 34 may be written at the last stage. The Example hereinbelow provides additional detailed examples for calculating the probability for different sized 2D carrier objects.

As such, when the number of stages in the workflow has been set and the probability of guessing the state-state transitions required for each stage has been calculated or is otherwise known, the size of the carrier object can be determined and the number of bits to write incrementally can also be determined.

In embodiments when the carrier object is selected after the total number of bits is identified, the identifying object registry 12 may consider, when selecting the carrier object, the total number of bits to be written to the carrier object, whether it is desirable to include entropy in the identifying object, whether it is desirable to include non-payload indicia in the identifying object, and whether it is desirable to utilize multi-modalities to encode information.

The inability to guess the initial state with a particular statistical probability may be added prior to the initiation of the workflow by partially filling available modules of the carrier object. It is to be understood that a partially completed state of the carrier object has greater security (statistically) than an all-white stare (or blank state) of the carrier object. In the case of a binary barcode, the entropy is $$\sum_{i \in (0,1)} p(i) * \ln(p(i)),$$

where p(0) is the percentage of white elements and p(1) is the sum of black elements. When all the modules are white or else all are black, the entropy is 0.0. When half are white and half are black, the entropy increases to its maximum of 0.693. In one example, if 16 of 64 payload bits are used to set entropy at the initiation of the workflow, 16 of the 64 payload bits should also be retained as white, unwritten to glyphs/areas at the end of the workflow to retain the entropy. Here, entropy is $-[0.25*\ln(0.25)+0.75*\ln(0.75)]=0.562$ (a substantial portion of the maximum possible value of 0.693). In this example, the carrier object should include at least 64 glyphs areas so that 32 glyphs/areas can be used for entropy and 32 glyphs/areas can be used to write the remainder of the 64 payload bits throughout the workflow (e.g., in a three stage workflow, 11 bits, 11 bits and 10 bits can be written to the carrier object, respectively).

The introduction of non-payload indicia also affects the size of the carrier object because non-payload indicia is included in modules/glyphs/areas of the carrier object that may have otherwise been written to with bits/information. Non-payload indicia do not contain bits/information, but rather are used for calibration (e.g., color, skew, and orientation calibration) of the carrier object, for example, at each stage in the workflow. Non-payload indicia may also be used for branding, symbology identification, or the like. When it is desirable to include non-payload indicia, the number of modules/glyphs/areas to be used for the non-payload indicia may be accounted for in the total number of modules/glyphs/areas that are desirable for the carrier object.

When selecting the carrier object, it may also be desirable to identify whether multi-modalities will be used to encode information. In these instances, additional information is physically overlaid on glyphs/areas before or after the glyphs/areas have progressed to the black state. The addition of such information may be accomplished using, for example, magnetic ink character recognition (MICR) ink, ultraviolet (UV) ink, infrared (IR) ink, conductive ink, capacitive ink, other taggants that can be read with a specialized reader (e.g., DNA), or finishes that can be read over the final black or other colored ink (e.g., lacquers that can be read by impedance, reflectance, etc.). If the use of multi-modalities is known when selecting the carrier object, the selection can account for the fact a single glyph/area in the carrier object may contain more information than the standard carrier object. The use of multi-modalities may be desirable, for example, when specialized readers are to be used for decoding (e.g., MICR readers, RFID readers, etc.), when there is paucity of real estate for the identifying object (i.e., 2D bar code), when security check-offs are desirable (e.g., use of UV ink requires a counterfeiter to purchase the product bearing the identifying object which creates a trail), when enhanced forensic capacity is desired (e.g., using IR inks), and/or when additional functionality is desired (e.g., conductive or capacitive information encoding).

When a multi-modality approach is used, each of the additional layers has the following characteristics: (1) glyph x-dimension, $dim_x$, (2) glyph y-dimension, $dim_y$, and (3) glyph intensity levels and associated number of bit levels, $n_b$. The number of additional bits/glyph is $\ln(n_b)/\ln(2)$.

As an example of using multi-modalities, an MICR ink layer is superimposed on the 2D security mark (e.g., which has dimensions $nglyphs_x$ by $nglyphs_y$, where the glyphs are sized $size_x$ by $size_y$). When the MICR ink (e.g., VersaInk black MICR ink manufactured by G7 Productivity Systems) is black, it may be used over black pixels, and thus is added after all of the color transformations have been made. Since in any given glyph there is either MICR or not, there are $\ln(2)/\ln(2)=1$ bits/glyph. If the MICR bits are $dim_x$ by $dim_y$ in size, then the number of MICR glyphs in the x-direction is (floor) $((nglyphs_x * size_x)/dim_x)$, where floor is the integer value (not rounded, as partial glyphs are not used) of the floating point value $(nglyphs_x * size_x)/dim_x$. The number of tiles in the y-direction is $(floor)((nglyphs_y * size_y)/dim_y)$. Thus, the overall number of bits added by the MICR, $N_b(MICR)$, is:

$$N_b(MICR) = (floor)((nglyphs_x * size_x)/dim_x) * (floor)((nglyphs_y * size_y)/dim_y)$$

In general, if more than one modality (MICR, UV, conductive, etc.) of layers are added to the barcode, the total number of bits are given by:

$$N_b(total) = \sum_{x \in modalities} (floor)((nglyphs_x * size_x)/dim_x) * (floor)((nglyphs_y * size_y)/dim_y) * \frac{\ln(n_b(x))}{\ln(2)}$$

Once the workflow is generated (including the various stages and the number of bits to be encoded in total and/or at each stage) and the carrier object is selected, the workflow is initiated. The workflow instructions (e.g., the procedural rules for the transmission of the document(s), actions or purposes associated with the document(s), and either the total number of bits to encode or number of bits to encode in the document's carrier object at each stage in the workflow) is transmitted electronically to at least the first computer/workstation (e.g., the computers/workstations located at the manufacturer) to be used at the first stage in the workflow. In one embodiment, the computers/workstations used during subsequent stages in the workflow may receive the instructions from the first computer/workstation or from a computer/workstation used in the previous workflow stage. In another embodiment, the computers/workstations used during subsequent stages in the workflow may retrieve the instructions from the registry 12 via the cloud computing network. In another embodiment, the workflow may be initiated without transmitting the workflow instructions. For example, the document and its associated carrier object may be transmitted to the first entity in the workflow. It is to be understood that as long as the starting point of the workflow is known, one can deduce each stage of the workflow.

Throughout the following discussion, reference is made to FIG. 2 and FIGS. 4A through 4E. FIGS. 4A through 4D illustrate a 2D carrier object 20 including modules, which in this examples are riles $T_1$, $T_2$, $T_3$, $T_4$, $T_5$ (all of which are not labeled with the reference character "T"), that can have information incrementally written thereto throughout the workflow. At the end of the workflow, the identifying object 20''' (i.e., 2D security mark) is generated. FIG. 4A illustrates modules/glyphs/areas (i.e., the tiles along the perimeter of carrier 20) that have been filled in with non-payload indicia NPI. In this example, the non-payload indicia NPI have been implemented as solid tiles (along the left and bottom sides of the carrier 20) and as alternating white/black tiles (along the top and right sides of the carrier 20), which provide calibration during subsequent processing. In FIG. 4A, the remaining white tiles (i.e., including tiles $T_1$, $T_2$, $T_3$, $T_1$, $T_5$ and not including non-payload indicia tiles NPI) are available candidate areas, which can have information written thereto throughout the workflow.

FIG. 4B illustrates 16 of the 64 available candidate areas being pre-filled with 1 bit of data each in order to add entropy to the carrier object 20.

The carrier object 20, and the document it is associated with, may be physically transmitted or electronically transmitted, and then received at the entity that is associated with the first stage in the workflow (see reference numeral 204 of FIG. 2). When physically transmitted and received, the document and carrier object 20 have been printed and shipped to the entity. When electronically transmitted and received, the document and carrier object 20 have been electronically sent (via email or some other electronic based messaging service) to a computer/workstation at the entity. Regardless of how the document and its associated carrier object 20 are transmitted and received at the entity, a user at the entity obtains an electronic form of the document and its associated carrier object 20. When electronically received, the user need not perform any additional task in order to obtain the electronic form, and when physically received, the user scans or captures with an imager (e.g., a camera) the current image of at least the carrier object 20 to obtain the electronic form.

When the action, task, etc. set forth in the workflow stage I instructions have been performed (e.g., a task is performed and a digital signature verifying task completion is obtained), the carrier object 20 is incrementally written to according to the workflow stage I instructions. This is shown in FIG. 4C.

When incrementally writing to the carrier object 20, the electronic form of the carrier object 20 is first segmented (i.e., imaged, as shown at reference numeral 206 of FIG. 2). Segmentation involves extracting the carrier object 20 from the overall electronic image and determining the content of the carrier object 20. In one embodiment, this is a two-stage process. First, the carrier object 20 is identified in the image and segmented from the entire image. Second, the carrier object 20 itself is interpreted (i.e., decoded).

Segmentation may also involve calibrating the carrier object 20. Calibration may involve orienting the carrier object 20 using the non-payload indicia 20, dewarping the carrier object 20, deskewing the carrier object 20, identifying a set of allowable hues, or the like. It is to be understood that calibration may be performed in conjunction with interpretation of the carrier object 20, or calibration may be performed and then interpretation of the carrier object 20 may be performed.

The carrier object 20 is interpreted/decoded by analyzing the pixels in each of the glyphs of the object 20. When more than 50% of the pixels in a glyph are black or some other designated color, the glyph will be identified as a "written-to" glyph. When more than 50% of the pixels in a glyph are white or some other designated color, the glyph will be identified as a non-written to (available) glyph. The interpretation/decoding of the carrier object 20 in FIG. 4B (as received by those performing workflow stage I) will reveal that there are non-payload indicia along the perimeter and that 16 of the 64 available candidate areas have been written to. The computer/workstation performing the incremental writing at workflow stage then determines the location of remaining available candidate areas (modules) that can be written to (e.g., tiles not already filled with non-payload indicia, entropy information, etc.), as shown at reference numeral 208 in FIG. 2. It is to be understood that a variety of algorithms may be used to determine where to place the information associated with workflow stage I (which may include the preset number of bits). Non-limiting examples of these algorithms include scrambling, random/nonce, one-time-pad, encryption, data replication, etc. These techniques identify where information can be added to the carrier object 20.

In one embodiment after the available candidate areas in the carrier object 20 are identified, the computer/workstation performing the incremental writing at workflow stage I then identifies or retrieves the preset number of bits (e.g., from the workflow instructions) to be written at the then-current stage. In other embodiments, the number of bits to be written at a particular stage may be determined automatically by the computer/workstation performing the incremental writing at workflow stage I and/or by a user at workflow stage I. In the latter embodiments, the total number of bits to be encoded throughout the workflow is known (i.e., the total number is preset), and the computers/workstations at each workflow stage would add a suitable amount of information to the carrier object 20. For example, a string containing 0's and then 1's incrementally to be written could be stored as a nonce and then the 1's would be incrementally written to the carrier object 20 stage by stage.

The computer/workstation performing the incremental writing at workflow stage I then determines how to write the information (i.e., the preset or dynamically determined number of bits), as shown at reference numeral 210 of FIG. 2. The computer/workstation includes a computer-readable medium with a computer program having computer readable code for selecting a scrambling technique for writing the data (see reference numeral 212 in FIG. 2) and computer readable code for selecting a manner in which a state change at this workflow stage will result in a predictable change in the carrier object 20 (see reference numeral 214 in FIG. 2).

When determining how to write the information, the computer/workstation will select the scrambling technique by identifying an algorithm to be used for incorporating the information for the current workflow stage. This algorithm may be random or nonce based, or may be deterministic. In instances where the registry-based workflow 14 is used, the previous state of the carrier object 20 may be replicated using the cloud network, so that random/nonce methods are valid when inputting new information. For example, the information to be added is provided by a random number generator and is stored in the registry 12. In this example, a string containing 0's and then 1's incrementally to be written could be stored as a nonce and then the 1's would be incrementally written to the carrier object 20 stage by stage. For example, if a 2D barcode has 15×15 tiles that can be written to, 60 tiles are pre-populated with NPI and/or entropy, and 20 bits are to be added at the current stage in the workflow, the random/nonce algorithm may write to 20 of the previously unwritten to 165 available areas. One embodiment for accomplishing this is as follows:

```
double random = Rand.NextRandom( );
Location = START; // first open space is position to write; if indicated
while( nwritten < 20 )
{
    if( random-residual < (20/165) )
    {
        Location.write( 1 ); // black tile
        nwritten++;
    }
    else
        Location.write( 0 ); //leave alone
    Location++; // position at next open space regardless
    // update residual here to ensure that one pass completes the writing
    of the 20 bits
}
```

The state (e.g., {100101101100011 . . . }) after all the new bits are written is stored in the registry 12 after the initial state (e.g., {100001001000010 . . . }. Due to the algorithms used, the Hamming distance between these two strings is definitively 20.

In instances where the independent incremental workflow 16 is used, each workflow stage involves an intelligent hash of the previous state of the carrier object 20 (or roughly equivalent from a security standpoint, the XOR of a current state with a random bit string to get to the next state). In this example, a deterministic approach may be used, in which the newly written information is determined from the current state of the carrier object 20 and any additional pre-populated information that distinguishes the carrier object 20 from other carrier objects (e.g., SKU specific information and mass serialization information). For example, if a document has other unique information, e.g., number for routing or another barcode/stock identifier for point of sale, the other unique information can be included in the digital signature (i.e., the output of an operation on a binary string using a private key) to create the next set of bits to write.

When determining how to write the information, the computer/workstation will also select a manner in which the state change results in a predictable or authenticable change in the carrier object 20 itself (again see reference numeral 214 of FIG. 2). In one embodiment, this is accomplished when a binary string representation of the current state of the carrier object 20 is transformed with a security string (e.g., a private key can be encrypted with the binary string).

The computer/workstation performing the incremental writing at workflow stage I then writes the information to the carrier object 20 to form the carrier object 20', as shown at reference numeral 216 of FIG. 2 and as illustrated in FIG. 4C. In this example, unwritten to (or available) candidate areas are written to. In other examples, available candidate areas may include those tiles or other glyphs that had previously been written to, but will be overwritten or layered using multi-modalities. During each writing stage in the workflow, it is to be understood that any previously written information will not be removed or changed.

While the number of bits to be written is preset in one embodiment, the actual writing of the information takes place dynamically as the workflow progresses. As such, the candidate areas that are actually overwritten are determined in real time according to, in part, the areas available for writing, the number of bits to be written, and the algorithms used.

The document and its incrementally overwritten carrier object 20' can be printed and/or stored. When the carrier object 20, 20' is completely physical, the document with the carrier object 20 printed thereon as it was received (from the previous stage or from the registry 12) can be overprinted so that the newly written to areas will be filled in the printed version. When the carrier object 20, 20' is physical and electronic, the electronic version of the document and the incrementally overwritten carrier object 20' can be reprinted, if desired. When the incrementally overwritten carrier object 20' is saved, it is to be understood that it will replace any prior versions of the carrier object 20.

The document and incrementally written to carrier object 20' are then shipped (electronically or physically) to the next entity in the workflow (reference numeral 204 of FIG. 2). When the action, task, etc. set forth in the workflow stage II instructions have been performed, the carrier object 20' is incrementally written to according to the workflow stage II instructions. This is shown in FIG. 4D. Incrementally writing information to the carrier object 20' to form carrier object 20" includes the steps of segmenting the electronic version of the carrier object 20' (reference numeral 206 of FIG. 2), determining the location of remaining available candidate areas that can be written to (e.g., tiles not already filled with non-payload indicia, entropy information, previously written information etc.) (reference numeral 208 of FIG. 2), identifying or retrieving the number of bits (e.g., from the workflow instructions) to be written at the then-current stage, determining how to write the information (reference numerals 210-214 of FIG. 2), and then writing the information to the carrier object 20' (reference numeral 216 of FIG. 2). In this example, unwritten to (or available) candidate areas are written to. In other examples, available candidate areas may include those tiles or other glyphs that had previously been written to, but will be overwritten or layered using multi-modalities. The document and its incrementally written to carrier object 20" can be printed and/or stored. It is to be understood that the steps involved in incrementally writing at this stage are performed via the computer/workstation at workflow stage II.

In the embodiment shown in FIGS. 4A through 4E, the document and incrementally written to carrier object 20" are then shipped (electronically or physically) to the next entity in the workflow (reference numeral 204 of FIG. 2). When the action, task, etc. set forth in the workflow stage III instructions have been performed, the carrier object 20" is incrementally overwritten according to the workflow stage III instructions. This is shown in FIG. 4E. Incrementally writing information to the carrier object 20" to form carrier object 20''' may be accomplished in a manner similar to that described for writing to earlier versions of the carrier object 20, 20'. Briefly, incremental writing at this stage in the workflow includes the steps of segmenting the electronic version of the carrier object 20" (reference numeral 206 of FIG. 2), determining the location of remaining available candidate areas that can be written to (e.g., tiles not already filled with non-payload indicia, entropy information, previously written information etc.) (reference numeral 208 of FIG. 2), identifying or retrieving the number of bits (e.g., from the workflow instructions) to be written at the then-current stage, determining how to write the information (reference numerals 210-214 of FIG. 2), and then writing the information to the carrier object 20" (reference numeral 216 of FIG. 2). In this example, non-overwritten (or available) candidate areas are overwritten. In other examples, available candidate areas may include those tiles or other glyphs that had previously been overwritten, but will be overwritten or layered using multi-modalities. The document and its incrementally written carrier object 20''' can be printed and/or stored. It is to be understood that the steps involved in incrementally writing at this stage are performed via the computer/workstation at workflow stage III.

Since the workflow in the example in FIGS. 4A through 4E include three workflow stages, the carrier object 20''' shown in FIG. 4E is the identifying object 20" or barcode/security mark that is a secure verification that the workflow has proceeded correctly. In this particular example, since 16 bits of entropy were included at the outset of the workflow (see FIG. 4B), 16 white tiles remain unwritten to in the final object 20''' in order to preserve the level of (statistical) security offered by making the final state as difficult to guess as the initial state. As illustrated in FIGS. 4A through 4E, the final identifying object 20''' has less available candidate areas than the original carrier object 20 due to the incremental writing throughout the workflow, but has the same shape and size as the original carrier object 20.

It is to be understood that the previous states of the carrier object 20, 20', 20" are still provable because there are no new available candidate areas in the later stage(s) of the carrier object 20, 20', 20", 20'''. In embodiments where the computers/workstations at each stage in the workflow have access to all the rules governing writing at the previous stages, these computers/workstations can automatically check all previous states of the carrier object for validity when checking the then-current state.

Referring now to FIGS. 5A through 5D, another embodiment of the carrier object 20 is depicted, however, these figures illustrate different examples of incremental writing that can take place at one stage of a workflow. FIGS. 5C and 5O in particular illustrate the dynamic writing that can take place using the embodiments disclosed herein.

FIGS. 5A and 5B are similar to FIGS. 4A and 4B, and illustrate a 2D carrier object 20 including tiles $T_1, T_2, T_3, T_4, T_5$ (all of which are not labeled with the reference character "T") that can have information incrementally written thereto throughout the workflow. This workflow includes one stage. FIG. 5A illustrates modules/glyphs/areas (i.e., the tiles along the perimeter of carrier 20) that have been filled in will non-payload indicia NPI, and FIG. 5B illustrates 16 of the available candidate areas (e.g., modules/glyphs/tiles available for being written to) being pre-filled with 1 bit of data each in order to add entropy to the carrier object 20. In one embodiment, if multiple identifying objects (e.g., 20' in FIGS. 5C and 5D) are part of the same shipment, it may be desirable to have the same pre-filled set of data bits. However, if multiple identifying objects are not part of the same shipment, it is noted that there are more than $4.88 \times 10^{14}$ ways of selecting 16 of the 64 pre-filled data bits.

At the one stage in this workflow, the carrier object 20 is to be infilled with 11 bits of data. There are more than $2.25 \times 10^{10}$ ways of selecting these 11 bits from the remaining 48 open tiles. The incremental nature of the writing affords much higher number of combinations for writing from one state to the next than the number of bits would simply indicate. FIGS. 5C and 5D illustrate that a number of unique identifying objects 20''' (or carrier objects 20', 20") can be readily computed at each stage in the workflow. Since there are numerous ways of writing information at the various stages, other carrier objects 20, 20', 20", 20''' will have available candidate areas at different locations, which aids in preventing casual counterfeiting since the odds of having two carrier objects 20, 20', 20", 20''' with the same available candidate areas at any stage of the workflow is very small.

To further illustrate embodiment(s) of the present disclosure, an example is given herein. It is to be understood that this example is provided for illustrative purposes and is not to be construed as limiting the scope of the disclosed embodiment(s).

EXAMPLE

Using the 2D barcode shown in FIGS. 4A through 4D, it was hypothesized that for any given pre-defined workflow with a finite number of steps, the statistical probability associated with step (defined as $P_i$), where the number of residual (0 bits) at the end of the workflow is $N_{RB}$, and the number of initial unwritten bits is $N_{IU}$, is governed by the equation:

$$\frac{N_{IU}!}{(N_{IU}-N_{RB})!N_{RB}!} \geq \prod_i P_i \qquad \text{Equation 1}$$

where ! is the factorial operator. $P_i$ was determined from, for example, the required statistical confidence that a next step cannot be randomly guessed multiplied by the total number of carrier objects of the current state that will be readable in the supply chain. If the carrier object is unique at step i−1, then the total number of carrier objects of the current state is 1.

The following hypothetical scenario was analyzed in light of the hypothesis above. In this scenario, there was a 2D barcode that was initially 25% filled with black tiles and upon completion of its workflow it was 75% filled with black tiles; and there were six steps in the workflow, namely manufacturer, four distributors, and the end retailer. For the purposes of this scenario, the $P_i$ values were $10^9$ for the manufacturer and the four distributors, and $10^3$ for the retailer. The $$\prod_i P_i$$

value was thus $10^{48}$.

In this example, bits {g, h, i, j, k, l} were needed to move through the workflow. The final number of bits, $N_{RB}$, was ⅓ of the original unwritten bits, $N_{IU}$. As such, the governing equations for each step in this workflow were:

$$\frac{N_{IU}!}{g!(N_{IU}-g)!} \geq 10^9 \qquad \text{Equation 2}$$

$$\frac{(N_{IU}-g)!}{h!(N_{IU}-g-h)!} \geq 10^9 \qquad \text{Equation 3}$$

$$\frac{(N_{IU}-g-h)!}{i!(N_{IU}-g-h-i)!} \geq 10^9 \qquad \text{Equation 4}$$

$$\frac{(N_{IU}-g-h-i)!}{j!(N_{IU}-g-h-i-j)!} \geq 10^9 \qquad \text{Equation 5}$$

$$\frac{(N_{IU}-g-h-i-j)!}{k!(N_{IU}-g-h-i-j-k)!} \geq 10^9 \qquad \text{Equation 6}$$

$$\frac{(N_{IU}-g-h-i-j-k)!}{l!(N_{IU}-g-h-i-j-k-l)!} \geq 10^3 \qquad \text{Equation 7}$$

Note that $(N_{IU}-g-h-i-j-k-l)!$ in Equation 7 is the same as $N_{RB}!$, and so chaining Equations 2-7 together gives Equation 8:

$$\frac{N_{IU}!}{g!h!i!j!k!l!N_{RB}!} \geq 10^{48} \qquad \text{Equation 8}$$

which is in similar form to Equation 1. With Equation 8, the overall number of bits required in this (or any other) 2D barcode (and by extension at each step in the workflow) can be computed.

Assuming g!=h!=i!=j!=k!, the equation simplifies to:

$$\frac{N_{IU}!}{(g!)^5 l! N_{RB}!} \geq 10^{48} \qquad \text{Equation 9}$$

Even with governing equations (2)-(9), there are still a large set of solutions. It was assumed that g≤h≤i≤j≤k, since they represent the number of open bits to achieve a given number of bits. For this scenario, it was also assumed that k>>l. With N glyphs/tiles, there are $2^N$ different states of the overall payload, and so the minimum number for N in this example is such that $2^N \geq 10^{48}$ or more. Thus, N≥160. Barcodes are generally represented as N×N where N is an even number, so for this scenario, N was initially selected as 14. This provided $2^{192}=6.277\times10^{57}$ states, which was sufficient to accommodate state changes {f, g, h, i, j, k} above, but was not enough to accommodate the initial fill and final fill glyphs/tiles. As such, N was changed to 16 (i.e., a 16×16 carrier object) or 256 glyphs/tiles. 32 glyphs/tiles were filled as the starting condition and 224 total were filled at the end of the workflow. This left 192 bits to be filled in during the workflow (with the additional statistical advantage of having 224 to choose from on the first step {g}).

Steps {g, h, i, j, k} were selected to have 36 bits written during each stage, and step {l} was selected to have 12 bits written during this stage. During step/stage {l}, then, the carrier object moved from 44 remaining open glyphs/tiles to 32 remaining open glyphs/tiles, and so the governing statistics were 44!/12!32!=2.1×10$^{10}$, which is well above the required $10^3$ for the retailer. For step/stage {k}, the governing statistics were 80!/36!44!=7.2×10$^{22}$, well above the required $10^9$ for one of the distributors. For steps/stages {g, h, i, j}, the statistics were even better: for step/stage {j} it was 116!/36!80!=1.27×10$^{30}$, for step/stage {i} it was 1.0×10$^{35}$, for step/stage {h} it was 5.5×10$^{38}$, and for step/stage {g} it was 5.5×10$^{41}$. This demonstrated that the number of state transitions is much higher than the number of states. In this case, $$\frac{N_{IU}!}{(g!)^5 l! N_{RB}!} = 6.23 \times 10^{178} \qquad \text{Equation 10}$$

A smaller barcode can also be accommodated. Another hypothetical scenario was analyzed using a 12×12 barcode. The initial number of unwritten bits ($N_{IU}$) was selected to be 136, so there were 3.76×10$^{12}$ initial states using 8 bits (144-136) to define the initial state, and 2.09×10$^{13}$ final states using 16 bits to define the final state. The remaining 120 bits for {g, h, i, j, k, l} use {22, 22, 22, 22, 22, 10} bits each, providing 1.28×10$^{25}$, 1.8×10$^{23}$, 9.2×10$^{20}$, 8.6×10$^{17}$, 2.74×10$^{13}$ and 5.1× 10$^6$ state transitions, respectively. As such, for this smaller barcode:

$$\frac{N_{IU}!}{(g!)^5 l! N_{RB}!} = 2.69 \times 10^{107} \qquad \text{Equation 11}$$

Embodiments of the identifying objects (or security marks) 20''' disclosed herein retain the set real estate on a document even through information is incrementally written thereto throughout a workflow. The state of the identifying object 20''' and the then-current stage of the workflow may be gleaned directly from the percentage of the elements that are filled in or saturated, without knowing how to interpret the data embedded therein.

While several embodiments have been described in detail, it will be apparent to those skilled in the art that the disclosed embodiments may be modified. Therefore, the foregoing description is to be considered non-limiting.

What is claimed is:

1. A system for generating an incrementally completed 2D security mark, comprising a computer-readable medium encoded with a computer program having:
   computer readable code for selecting a symbology for the 2D security mark;
   computer readable code for selecting a scrambling technique for data to be incrementally placed into a carrier object of the 2D security mark at each stage in a workflow including multiple stages; and
   computer readable code for selecting a manner in which a state change of the carrier object at each stage in the workflow results in a predictable change in the 2D security mark;
   wherein the system further includes memory and a processor operatively coupled to the memory and to the computer-readable medium.

2. The system as defined in claim 1, further comprising computer readable code for starting the workflow in a partially filled state of the carrier object that is different from a blank state of the carrier object.

3. The system as defined in claim 1 wherein the computer readable code for selecting the symbology for the 2D security mark -includes:
   computer readable code for selecting a pre-existing symbology; and
   computer readable code for generating a new symbology.

4. The system as defined in claim 3 wherein the pre-exisiting symbology or the new symbology includes a plurality of modules, each of which can hold a background state or a foreground state, wherein the background state of a single module contains no information, and wherein the foreground state of a single module contains 1 bit of data.

5. The system as defined in claim 1, further comprising computer readable code for setting a Hamming distance between states of the 2D security mark.

6. The system as defined in claim 1, further comprising computer readable code for setting non-payload indicia in the carrier object.

7. The system as defined in claim 1, further comprising computer readable code for determining a number of bits to be input to the carrier object at each step in the workflow to meet statistical targets.

8. The system as defined in claim 7, further comprising computer readable code for incrementally writing the number of bits at a particular step in the workflow, the computer readable code for incrementally writing including:
   computer readable code for segmenting the carrier object from an image including the carrier object;
   computer readable code for interpreting the carrier object to determine a location of remaining available modules of the carrier object that can be written to; and
   computer readable code for writing the number of bits to some of the remaining available modules using the selected scrambling technique and in accordance with the selected manner.

9. A 2D security mark, comprising:
   a carrier object including a set of modules, the set having a size and shape that are unchanged as information is written to individual modules of the set; and
   available individual modules in the set of modules for receiving information, each of the available individual modules holding one of two states, at least some of the available individual modules having had the information written thereto during different stages of a workflow such that the carrier object is different at the different stages of the workflow, thereby forming the 2D security mark having a smaller percentage of available individual modules than is included in the set of modules prior to the workflow.

10. The 2D security mark as defined in claim 9 wherein the 2D security mark is chosen from an electronic security mark, a mixed electronic and physical security mark wherein the carrier object transitions between an electronic state and a physical state during a lifecycle of the 2D security mark, and a physical security mark.

11. The 2D security mark as defined in claim 9 wherein a first of the two states is equivalent to a background color module and a second of the two states is a foreground color module.

12. The 2D security mark as defined in claim 9, further comprising a total number of bits input into the carrier object, wherein a portion of the total number of bits input at the different stages of the workflow are selected to meet statistical targets.

13. The 2D security mark as defined in claim 9, further comprising at least one of:
   information written to some available individual modules in the set of modules prior to initiation of the workflow; or
   non-payload indicia modules (NPI) set prior to initiation of the workflow.

14. A method for generating a 2D security mark, comprising:
   selecting a carrier object for the 2D security mark (20'''), the carrier object including a set of modules, wherein each module can hold one of two states;
   pre-assigning or dynamically determining a number of bits to be encoded in the carrier object at each stage in a workflow;
   at each stage in the workflow, receiving the carrier object;
   at each stage in the workflow, imaging the carrier object;
   at each stage in the workflow, determining a location of available individual modules in the carrier object;
   at each stage in the workflow, determining how to write the bits to the available individual modules by:
      selecting a scrambling technique; and
      selecting a manner in which each state change of the carrier object results in a predictable change in the carrier object; and
   at each stage in the workflow, writing the bits to at least some of the available individual modules.

15. The method as defined in claim 14, further comprising setting entropy areas in the carrier object.

16. The method as defined in claim 14 wherein prior to pre-assigning or dynamically determining the number of bits to be encoded in the carrier object at each stage in the workflow, the method further includes determining the number of bits to be encoded by at least one of:
   probability; and
   determining a Hamming distance between states of the 2D security mark.

* * * * *

UNITED STATES PATENT AND TRADEMARK OFFICE
CERTIFICATE OF CORRECTION

PATENT NO. : 8,864,041 B2
APPLICATION NO. : 13/810682
DATED : October 21, 2014
INVENTOR(S) : Steven J Simske et al.

It is certified that error appears in the above-identified patent and that said Letters Patent is hereby corrected as shown below:

In the Claims

In column 15, line 34, in Claim 3, delete "-includes:" and insert -- includes; --, therefor.

In column 15, lines 38-39, in Claim 4, delete "pre-exisiting" and insert -- pre-existing --, therefor.

In column 16, line 39, in Claim 14, after "mark" delete "(20'")".

Signed and Sealed this
Third Day of March, 2015

Michelle K. Lee
*Deputy Director of the United States Patent and Trademark Office*